(12) United States Patent
Diorio et al.

(10) Patent No.: US 11,341,837 B1
(45) Date of Patent: *May 24, 2022

(54) ENVIRONMENT-BASED RFID IC BEHAVIOR

(71) Applicant: Impinj, Inc., Seattle, WA (US)

(72) Inventors: Christopher J. Diorio, Shoreline, WA (US); Harley Heinrich, Snohomish, WA (US); Matthew Robshaw, Seattle, WA (US); Theron Stanford, Seattle, WA (US); Charles J. T. Peach, Seattle, WA (US); John D. Hyde, Corvallis, OR (US); Tan Mau Wu, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/134,729

(22) Filed: Dec. 28, 2020

Related U.S. Application Data

(63) Continuation of application No. 16/382,233, filed on Apr. 12, 2019, now Pat. No. 10,878,685.
(Continued)

(51) Int. Cl.
*G08B 13/24* (2006.01)
*G08B 21/18* (2006.01)
(Continued)

(52) U.S. Cl.
CPC ....... *G08B 21/182* (2013.01); *G06K 7/10366* (2013.01); *G06K 19/0723* (2013.01)

(58) Field of Classification Search
CPC ............. G08B 21/182; G06K 7/10366; G06K 19/0723
See application file for complete search history.

(56) References Cited

U.S. PATENT DOCUMENTS

| 8,669,872 B1 | 3/2014 | Stanford et al. |
| 9,064,196 B1 | 6/2015 | Gutnik et al. |

(Continued)

FOREIGN PATENT DOCUMENTS

WO 0122377 A1 3/2001

OTHER PUBLICATIONS

European Search Report App. No. EP21157158.3 dated May 3, 2021, pp. 8.
(Continued)

*Primary Examiner* — An T Nguyen
(74) *Attorney, Agent, or Firm* — Mannava & Kang, P. C.

(57) ABSTRACT

RFID ICs sense and indicate changes in their surrounding environment, such as changes in temperature, humidity, chemical presence, RF signals, and similar. An RFID IC indicates when a significant environmental change has occurred, for example by adjusting the value of a flag, writing data to memory, transmitting a message to an external entity, exiting a sleep state, and/or responding repeatedly to an inventorying reader. In some cases, RFID IC actively notifies an external entity that a significant environmental change has been sensed. For example, RFID IC may alert the external entity by participating in a special inventory process meant for RFID ICs sending environmental change. The RFID IC may alert the external entity by interjecting itself into an inventory round, re-participating in an inventory round, refraining from entering a sleep state after inventorying, and/or adjusting timing of a scheduled reply to communicate with an RFID reader ahead of schedule.

21 Claims, 10 Drawing Sheets

Related U.S. Application Data

(60) Provisional application No. 62/688,116, filed on Jun. 21, 2018.

(51) Int. Cl.
  *G06K 7/10* (2006.01)
  *G06K 19/07* (2006.01)

(56) References Cited

U.S. PATENT DOCUMENTS

| | | | |
|---|---|---|---|
| 9,576,454 B2 | 2/2017 | Hosseini et al. | |
| 9,865,145 B2 | 1/2018 | Hosseini et al. | |
| 10,078,947 B2 | 9/2018 | Hosseini et al. | |
| 2005/0116826 A1 | 6/2005 | Wertsebrger | |
| 2006/0017545 A1 | 1/2006 | Volpi et al. | |
| 2007/0222591 A1 | 9/2007 | Kimata | |
| 2008/0266055 A1* | 10/2008 | Turner | G06K 19/0723 340/10.1 |
| 2012/0161967 A1* | 6/2012 | Stern | G06K 7/10366 340/572.1 |
| 2014/0225735 A1* | 8/2014 | Hosseini | G08B 13/2451 340/572.1 |
| 2017/0162017 A1 | 6/2017 | Hosseini et al. | |
| 2018/0158302 A1 | 6/2018 | Hosseini et al. | |

OTHER PUBLICATIONS

European Search Report App. No. EP19181083.7 dated Nov. 11, 2019, pp. 7.
Non-Final Action for U.S. Appl. No. 16/382,233 dated Mar. 31, 2020, pp. 12.
Notice of Allowance for U.S. Appl. No. 16/382,233 dated Aug. 26, 2020, pp. 13.

* cited by examiner

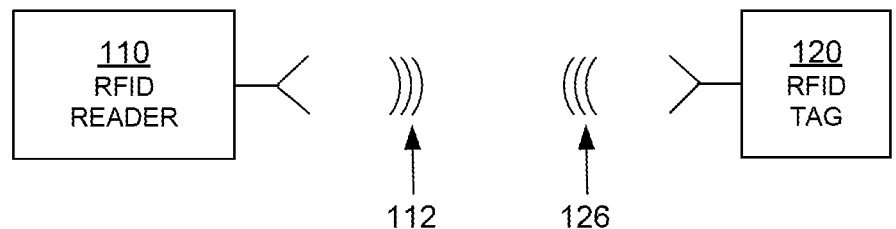
FIG. 1
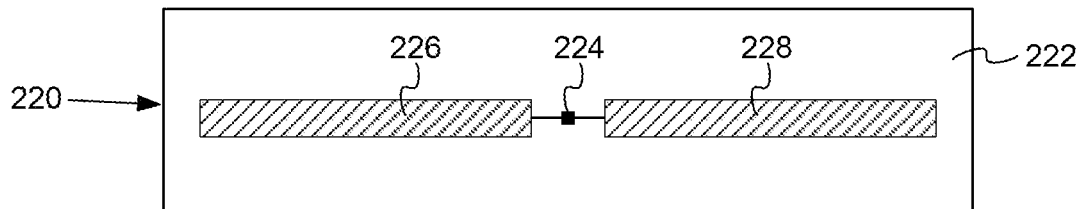
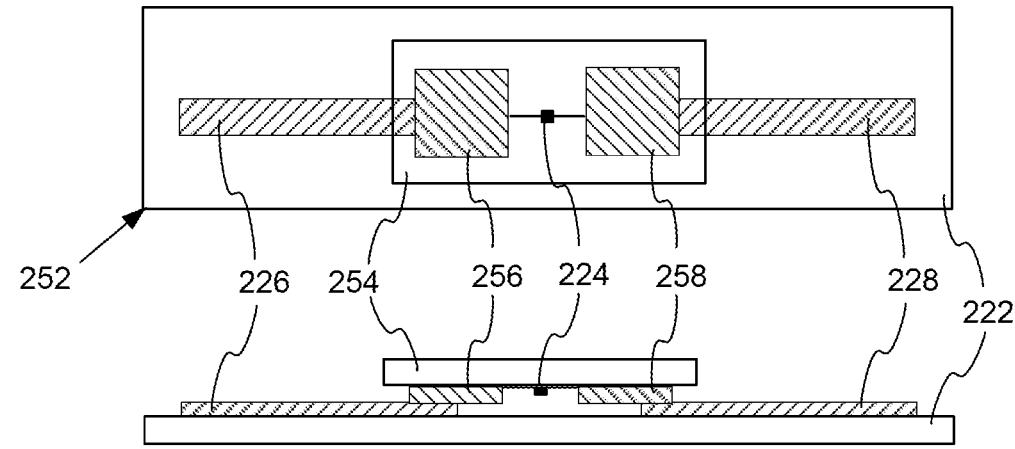
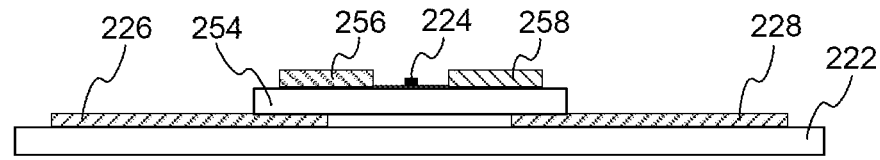
FIG. 2

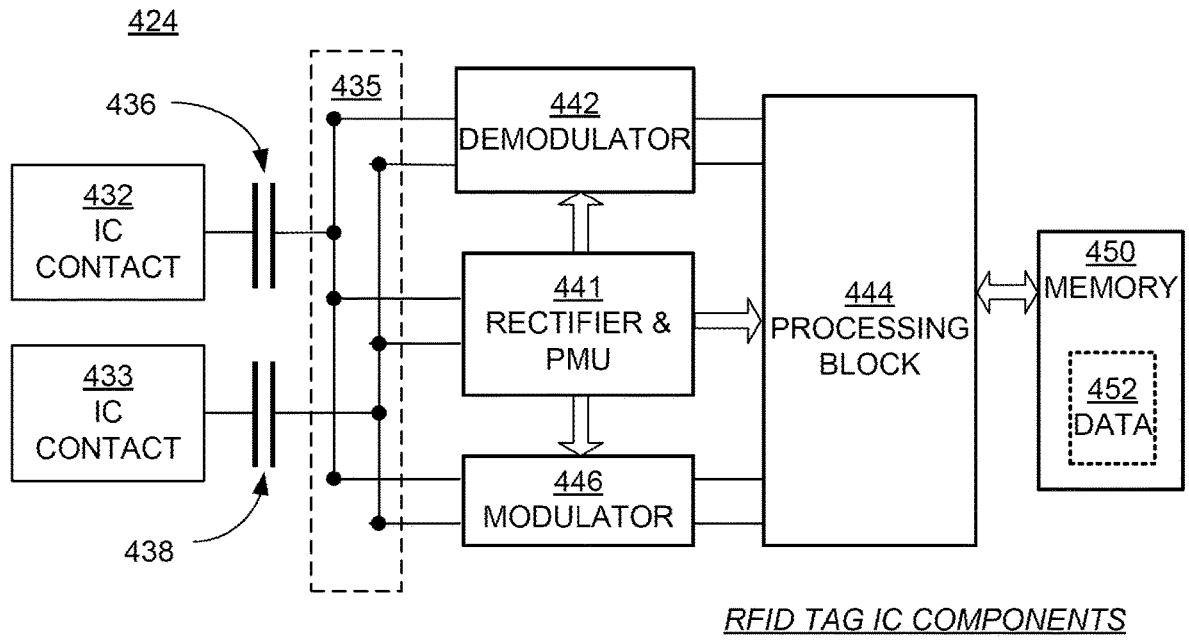
FIG. 4
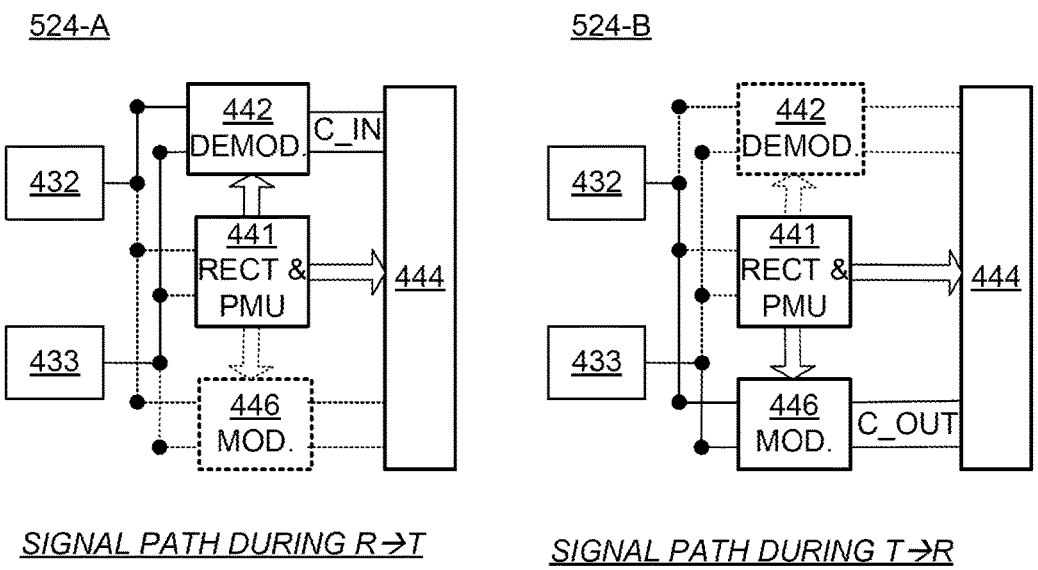
FIG. 5A  FIG. 5B

ENVIRONMENT-BASED RFID IC BEHAVIOR

CROSS REFERENCE TO RELATED APPLICATIONS

This application is a continuation of U.S. application Ser. No. 16/382,233, filed on Apr. 12, 2019, which claims the benefit of U.S. Provisional Patent Application Ser. No. 62/688,116 filed on Jun. 21, 2018. The disclosures of the above application are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package. The RFID tag typically includes, or is, a radio-frequency (RF) integrated circuit (IC).

In principle, RFID techniques entail using an RFID reader to inventory one or more RFID tags, where inventorying involves at least singulating a tag and receiving an identifier from the singulated tag. "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. An "inventory round" is defined as a reader staging RFID tags for successive inventorying. The reader transmitting a Radio-Frequency (RF) wave performs the inventory. The RF wave is typically electromagnetic, at least in the far field. The RF wave can also be predominantly electric or magnetic in the near or transitional near field. The RF wave may encode one or more commands that instruct the tags to perform one or more actions. The operation of an RFID reader sending commands to an RFID tag is sometimes known as the reader "interrogating" the tag.

In typical RFID systems, an RFID reader transmits a modulated RF inventory signal (a command), receives a tag reply, and transmits an RF acknowledgement signal responsive to the tag reply. A tag that replies to the interrogating RF wave does so by transmitting back another RF wave. The tag either generates the transmitted back RF wave originally, or by reflecting back a portion of the interrogating RF wave in a process known as backscatter. Backscatter may take place in several ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

RFID systems are sometimes characterized as interrogator-talks-first or as tag-talks-first. In the former, a tag backscatters data after receiving a command instructing it to do so. In the latter, a tag backscatters data upon receiving RF energy. Regardless of the type, RFID systems typically schedule or queue the tag backscatter using anticollision algorithms to avoid multiple tags backscattering at the same time. These anticollision algorithms include slotted-Aloha, random timeslotting and a host of other scheduling algorithms as will be known to those practiced in the art.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors. In some embodiments, an RFID tag is attached to its host item. In other embodiments, an RFID tag may be an integral part of its host item.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

RFID tags in reader-talks-first systems have been historically unable to draw the attention of a reader to a timely environmental input, because the reader controls the tag's communication timing, not the tag itself. The reader sends a command initiating an inventory round, thereby staging tags for successive inventorying, and each tag identifies itself at its allotted time or in its allotted timeslot, optionally sending its environmental data at that time. The timing or timeslotting of the tag's reply has historically been independent of environmental inputs, but in many cases a reader's ability to extract value from the environmental input depends on the reader knowing when the tag's environment changes. To address this shortcoming, embodiments are directed to an RFID tag IC that advances its reply based on environmental inputs such as temperature, humidity, chemical composition, RF energy, light, and the like, to alert a reader in a timely fashion that something important is happening. Specifically, embodiments are directed to RFID tag ICs sensing changes in their environment, and upon sensing such changes adjusting their reply timing to reply more promptly to a reader. In a simple but not-limiting analogy, consider a tag population queued for inventory. Upon one tag sensing a change in its environment, the one tag may respond sooner to the reader then it would have absent the sensed change, or join an inventory round based on sensing the change when it may not have joined otherwise, or in some other fashion advance or modify the timing of its communications, thereby enabling the reader to learn about and potentially act on the environmental change.

An RFID tag so configured to advance its response as a consequence of an environmental change may do so by adjusting a reply timer, changing a reply timeslot, changing a timing characteristic of a communications protocol, exiting a sleep state, replying immediately upon sensing the environmental change, entering an inventory round configured for such advanced-reply tags, entering an inventory round it wasn't currently participating in, or in a variety of other ways.

An RFID tag so configured to advance its response as a consequence of an environmental change may indicate the environmental change in its backscattered reply by adjusting a flag or indicator value, transmitting additional or different data to the reader, altering the RF characteristics of its reply, altering the timing of its reply or in a variety of other ways.

An RFID tag so configured to advance its response as a consequence of an environmental change may sense the environmental change by comparing a measured value to a threshold, mean, limit-value or boundary condition; comparing a measured rate-of-change to a threshold, mean, limit-value or boundary condition; or by otherwise sensing the change in the myriad ways known to those skilled in the art. In some embodiments the tag may tune or adjust the magnitude of its response advancement with a parameter of the environmental change, such as a magnitude of the change, a derivative of the magnitude of the change, a time since a prior change, a presence of multiple changes, or another parameter of the change.

In some embodiments an RFID reader may initiate a standard inventory round and a tag, sensing the environmental change, my alter its behavior in, or choose to enter, that standard inventory round because of the change. In other embodiments an RFID reader may initiate a special inventory round looking for tags that sense environmental changes, such as one in which only environmental-change-sensing tags reply, or one in which tags remain dormant or asleep until they sense an environmental change and reply, or one in which the reader allows environmental-change-sensing tags to alter a parameter of a communications protocol. In yet other embodiments an RFID reader, upon hearing a response from a tag that has sensed an environmental change, may broadcast a command (i.e. send a command to multiple tags) temporarily silencing other tags so it can focus on the tag with the environmental change. In some embodiments the broadcast command may be configured for the purpose of so initiating or notifying or silencing, whereas in other embodiments the broadcast command may be a repurposed standard command containing a waveform or pattern that performs the initiating or notifying or silencing. In yet other embodiments the broadcast command may be a sequence of commands.

According to some examples, an RFID IC may provide an environmental alert by performing a first measurement of an environmental parameter at a first time and comparing the first measurement to either a baseline value or a second measurement of the environmental parameter at a second time to determine a difference. If the difference meets a threshold, then the IC may provide the alert by (a) participating in an inventory round, else not participating in the inventory round; (b) advancing a currently scheduled reply in an ongoing inventory round, else not advancing the reply; and/or (c) replying multiple times in an inventory round.

According to other examples, an RFID IC may provide an environmental alert by performing a first measurement of an environmental parameter at a first time, performing a second measurement of the environmental parameter at a second time, and determining a change in the environmental parameter based on the first and second measurements (e.g., a rate-of-change of the environmental parameter). If the determined change meets a threshold, then the IC may provide the alert by (a) participating in an inventory round, else not participating in the inventory round; (b) advancing a currently scheduled reply in an ongoing inventory round, else not advancing the reply; and/or (c) replying multiple times in an inventory round.

The environmental parameter measurement in the above examples may be a received RF power, a received RF frequency, a rate-of-change of the power or frequency or any other RF parameter as will be known to those skilled in the art.

Regardless of the methodology the RFID IC uses to alert the reader, the IC may further include in its reply an indication that it is signaling an environmental change using one or more reply bits or by modifying a waveform feature in its reply.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that can be used in the system of FIG. 1.

FIG. 4 is a block diagram showing a detail of an RFID tag, such as the one shown in FIG. 2.

FIGS. 5A and 5B illustrate signal paths during tag-to-reader and reader-to-tag communications in the block diagram of FIG. 4.

DETAILED DESCRIPTION

Figure 3:
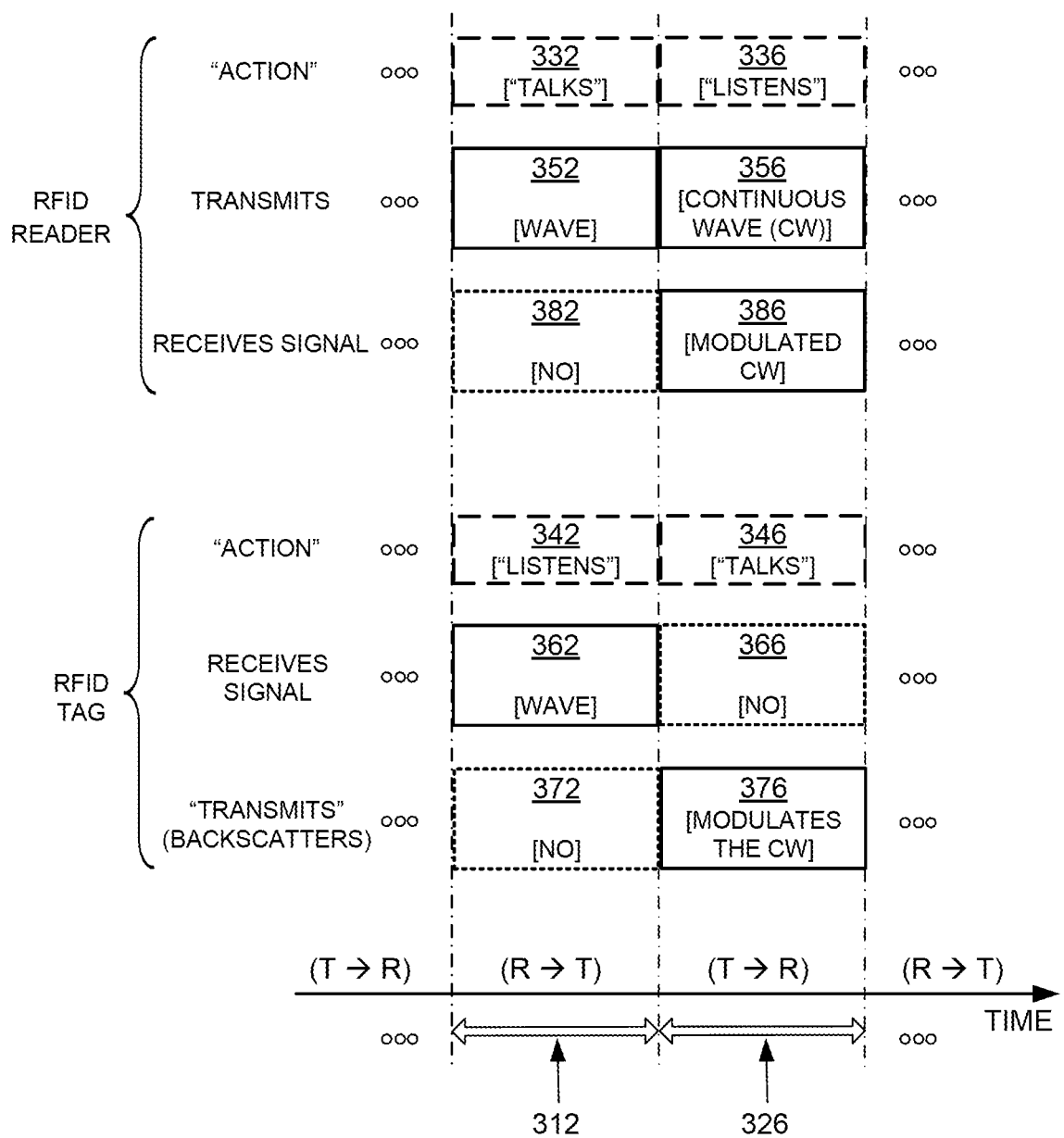
FIG. 3 is a conceptual diagram for explaining a half-duplex mode of communication between the components of the RFID system of FIG. 1.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Protocol"), versions 1.2.0 and 2.0 of which are hereby incorporated by reference.

FIG. 1 is a diagram of the components of a typical RFID system 100, incorporating embodiments. An RFID reader 110 and a nearby RFID tag 120 communicate via RF signals 112 and 126. When sending data to tag 120, reader 110 may generate RF signal 112 by encoding the data, modulating an RF waveform with the encoded data, and transmitting the modulated RF waveform as RF signal 112. In turn, tag 120 may receive RF signal 112, demodulate encoded data from RF signal 112, and decode the encoded data. Similarly, when sending data to reader 110 tag 120 may generate RF signal 126 by encoding the data, modulating an RF waveform with the encoded data, and causing the modulated RF waveform to be sent as RF signal 126. The data sent between reader 110 and tag 120 may be represented by symbols, also known as RFID symbols. A symbol may be a delimiter, a calibration value, or implemented to represent binary data, such as "0" and "1", if desired. Upon processing by reader 110 and tag 120, symbols may be treated as values, numbers, or any other suitable data representations.

The RF waveforms transmitted by reader 110 and/or tag 120 may be in a suitable range of frequencies, such as those near 900 MHz, 13.56 MHz, or similar. In some embodiments, RF signals 112 and/or 126 may include non-propagating RF signals, such as reactive near-field signals or similar. RFID tag 120 may be active or battery-assisted (i.e., possessing its own power source), or passive. In the latter case, RFID tag 120 may harvest power from RF signal 112.

FIG. 2 is a diagram of an RFID tag 220, which may function as tag 120 of FIG. 1. Tag 220 may be formed on a substantially planar inlay 222, which can be made in any suitable way. Tag 220 includes a circuit which may be implemented as an IC 224. In some embodiments IC 224 is fabricated in complementary metal-oxide semiconductor (CMOS) technology. In other embodiments IC 224 may be fabricated in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for transmitting and/or interacting with RF signals. In some embodiments the antenna can be etched, deposited, and/or printed metal on inlay 222; conductive thread formed with or without substrate 222; nonmetallic conductive (such as graphene) patterning on substrate 222; a first antenna coupled inductively, capacitively, or galvanically to a second antenna; or can be fabricated in myriad other ways that exist for forming antennas to receive RF waves. In some embodiments the antenna may even be formed in IC 224. Regardless of the antenna type, IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the terms "electrically isolated" or "electrically decoupled" as used herein mean that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments. Antenna segments 226 and 228 are depicted as separate from IC 224, but in other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments, the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna couples with RF signals in the environment and propagates the signals to IC 224, which may both harvest power and respond if appropriate, based on the incoming signals and the IC's internal state. If IC 224 uses backscatter modulation then it may generate a response signal (e.g., signal 126) from an RF signal in the environment (e.g., signal 112) by modulating the antenna's reflectance. Electrically coupling and uncoupling the IC contacts of IC 224 can modulate the antenna's reflectance, as can varying the admittance or impedance of a shunt-connected or series-connected circuit element which is coupled to the IC contacts. If IC 224 is capable of transmitting signals (e.g., has its own power source, is coupled to an external power source, and/or is can harvest sufficient power to transmit signals), then IC 224 may respond by transmitting response signal 126. In the embodiments of FIG. 2, antenna segments 226 and 228 are separate from IC 224. In other embodiments, the antenna segments may alternatively be formed on IC 224.

An RFID tag such as tag 220 is often attached to or associated with an individual item or the item packaging. An RFID tag may be fabricated and then attached to the item or packaging, may be partly fabricated before attachment to the item or packaging and then completely fabricated upon attachment to the item or packaging, or the manufacturing process of the item or packaging may include the fabrication of the RFID tag. In some embodiments, the RFID tag may be integrated into the item or packaging, and portions of the item or packaging may serve as tag components. For example, conductive item or packaging portions may serve as tag antenna segments or contacts. Nonconductive item or packaging portions may serve as tag substrates or inlays. If the item or packaging includes integrated circuits or other circuitry, some portion of the circuitry may be configured to operate as part or all of an RFID tag IC. Thus, an "RFID IC" need not be distinct from an item, but more generally refers to the item containing an RFID IC and antenna capable of interacting with RF waves and receiving and responding to RFID signals. Because the boundaries between IC, tag, and item are thus often blurred, the term "RFID IC" or "RFID tag" as used herein may refer to the IC, the tag, or even to the item as long as the referenced element is capable of RFID functionality.

The components of the RFID system of FIG. 1 may communicate with each other in any number of modes. One such mode is called full duplex, where both reader 110 and tag 120 can transmit at the same time. In some embodiments, RFID system 100 may be capable of full duplex communication. Another such mode, which may be more suitable for passive tags, is called half-duplex, and is described below.

FIG. 3 is a conceptual diagram 300 for explaining half-duplex communications between the components of the RFID system of FIG. 1, in this case with tag 120 implemented as a passive tag. The explanation is made with reference to a TIME axis, and also to a human metaphor of "talking" and "listening". The actual technical implementations for "talking" and "listening" are now described.

In a half-duplex communication mode, RFID reader 110 and RFID tag 120 talk and listen to each other by taking turns. As seen on axis TIME, reader 110 talks to tag 120 during intervals designated "R→T", and tag 120 talks to reader 110 during intervals designated "T→R". For example, a sample R→T interval occurs during time interval 312, during which reader 110 talks (block 332) and tag 120 listens (block 342). A following sample T→R interval occurs during time interval 326, during which reader 110 listens (block 336) and tag 120 listens (block 346). Interval 312 may be of a different duration than interval 326—here the durations are shown approximately equal only for purposes of illustration.

During interval 312, reader 110 transmits a signal such as signal 112 described in FIG. 1 (block 352), while tag 120 receives the reader signal (block 362), processes the reader signal to extract data, and harvests power from the reader signal. While receiving the reader signal, tag 120 does not backscatter (block 372), and therefore reader 110 does not receive a signal from tag 120 (block 382).

During interval 326, also known as a backscatter time interval or backscatter interval, reader 110 does not transmit a data-bearing signal. Instead, reader 110 transmits a continuous wave (CW) signal, which is a carrier that generally does not encode information. The CW signal provides energy for tag 120 to harvest as well as a waveform that tag 120 can modulate to form a backscatter response signal. Accordingly, during interval 326 tag 120 is not receiving a signal with encoded information (block 366) and instead modulates the CW signal (block 376) to generate a backscatter signal such as signal 126 described in FIG. 2. Tag 120 may modulate the CW signal to generate a backscatter signal by adjusting its antenna reflectance, as described above. Reader 110 then receives and processes the backscatter signal (block 386).

FIG. 4 is a block diagram showing a detail of an RFID IC, such as IC 224 in FIG. 2. Electrical circuit 424 may be implemented in an IC, such as IC 224. Circuit 424 implements at least two IC contacts 432 and 433, suitable for coupling to antenna segments such as antenna segments 226/228 in FIG. 2. When two IC contacts form the signal input from and signal return to an antenna they are often referred-to as an antenna port. IC contacts 432 and 433 may be made in any suitable way, such as from electrically-conductive pads, bumps, or similar. In some embodiments circuit 424 implements more than two IC contacts, especially when configured with multiple antenna ports and/or to couple to multiple antennas.

Circuit 424 includes signal-routing section 435 which may include signal wiring, signal-routing busses, receive/transmit switches, and similar that can route signals between the components of circuit 424. IC contacts 432/433 may couple galvanically, capacitively, and/or inductively to signal-routing section 435. For example, optional capacitors 436 and/or 438 may capacitively couple IC contacts 432/433 to signal-routing section 435, thereby galvanically decoupling IC contacts 432/433 from signal-routing section 435 and other components of circuit 424.

Capacitive coupling (and the resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In these embodiments, galvanically decoupling IC contact 432 from IC contact 433 may prevent the formation of a DC short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 includes a rectifier and PMU (Power Management Unit) 441 that harvests energy from the RF signal incident on antenna segments 226/228 to power the circuits of IC 424 during either or both reader-to-tag (R→T) and tag-to-reader (T→R) intervals. Rectifier and PMU 441 may be implemented in any way known in the art, and may include one or more components configured to convert an alternating-current (AC) or time-varying signal into a direct-current (DC) or substantially time-invariant signal.

Circuit 424 also includes a demodulator 442, a processing block 444, a memory 450, and a modulator 446. Demodulator 442 demodulates the RF signal received via IC contacts 432/433, and may be implemented in any suitable way, for example using a slicer, an amplifier, and other similar components. Processing block 444 receives the output from demodulator 442, performs operations such as command decoding, memory interfacing, and other related operations, and may generate an output signal for transmission. Processing block 444 may be implemented in any suitable way, for example by combinations of one or more of a processor, memory, decoder, encoder, and other similar components. Memory 450 stores data 452, and may be at least partly implemented as permanent or semi-permanent memory such as nonvolatile memory (NVM), EEPROM, ROM, or other memory types configured to retain data 452 even when circuit 424 does not have power. Processing block 444 may be configured to read data from and/or write data to memory 450.

Modulator 446 generates a modulated signal from the output signal generated by processing block 444. In one embodiment, modulator 446 generates the modulated signal by driving the load presented by antenna segment(s) coupled to IC contacts 432/433 to form a backscatter signal as described above. In another embodiment, modulator 446 includes and/or uses a transmitter to generate and transmit the modulated signal via antenna segment(s) coupled to IC contacts 432/433. Modulator 446 may be implemented in any suitable way, for example using a switch, driver, amplifier, and other similar components. Demodulator 442 and modulator 446 may be separate components, combined in a single transceiver circuit, and/or part of processing block 444.

In some embodiments, particularly in those with more than one antenna port, circuit 424 may contain multiple demodulators, rectifiers, PMUs, modulators, processing blocks, and/or memories.

FIG. 5A shows version 524-A of components of circuit 424 of FIG. 4, further modified to emphasize a signal operation during a R→T interval (e.g., time interval 312 of FIG. 3). During the R→T interval, demodulator 442 demodulates an RF signal received from IC contacts 432/433. The demodulated signal is provided to processing block 444 as C_IN, which in some embodiments may include a received stream of symbols. Rectifier and PMU 441 may be active, for example harvesting power from an incident RF waveform and providing power to demodulator 442, processing block 444, and other circuit components. During the R→T interval, modulator 446 is not actively modulating a signal, and in fact may be decoupled from the RF signal. For example, signal routing section 435 may be configured to decouple modulator 446 from the RF signal, or an impedance of modulator 446 may be adjusted to decouple it from the RF signal.

FIG. 5B shows version 524-B of components of circuit 424 of FIG. 4, further modified to emphasize a signal operation during a T→R interval (e.g., time interval 326 of FIG. 3). During the T→R interval, processing block 444 outputs a signal C_OUT, which may include a stream of symbols for transmission. Modulator 446 then generates a modulated signal from C_OUT and sends the modulated signal via antenna segment(s) coupled to IC contacts 432/433, as described above. During the T→R interval, rectifier and PMU 441 may be active, while demodulator 442 may not be actively demodulating a signal. In some embodiments, demodulator 442 may be decoupled from the RF signal during the T→R interval. For example, signal routing section 435 may be configured to decouple demodulator 442 from the RF signal, or an impedance of demodulator 442 may be adjusted to decouple it from the RF signal.

In typical embodiments, demodulator 442 and modulator 446 are operable to demodulate and modulate signals according to a protocol, such as the Gen2 Protocol mentioned above. In embodiments where circuit 424 includes multiple demodulators modulators, and/or processing blocks, each may be configured to support different protocols or different sets of protocols. A protocol specifies, in part, symbol encodings, and may include a set of modulations, rates, timings, or any other parameter associated with data communications. A protocol can be a variant of an internationally ratified protocol such as the Gen2 Protocol, for example including fewer or additional commands than the ratified protocol calls for, and so on. In some instances, additional commands may sometimes be called custom commands.

Figure 6:
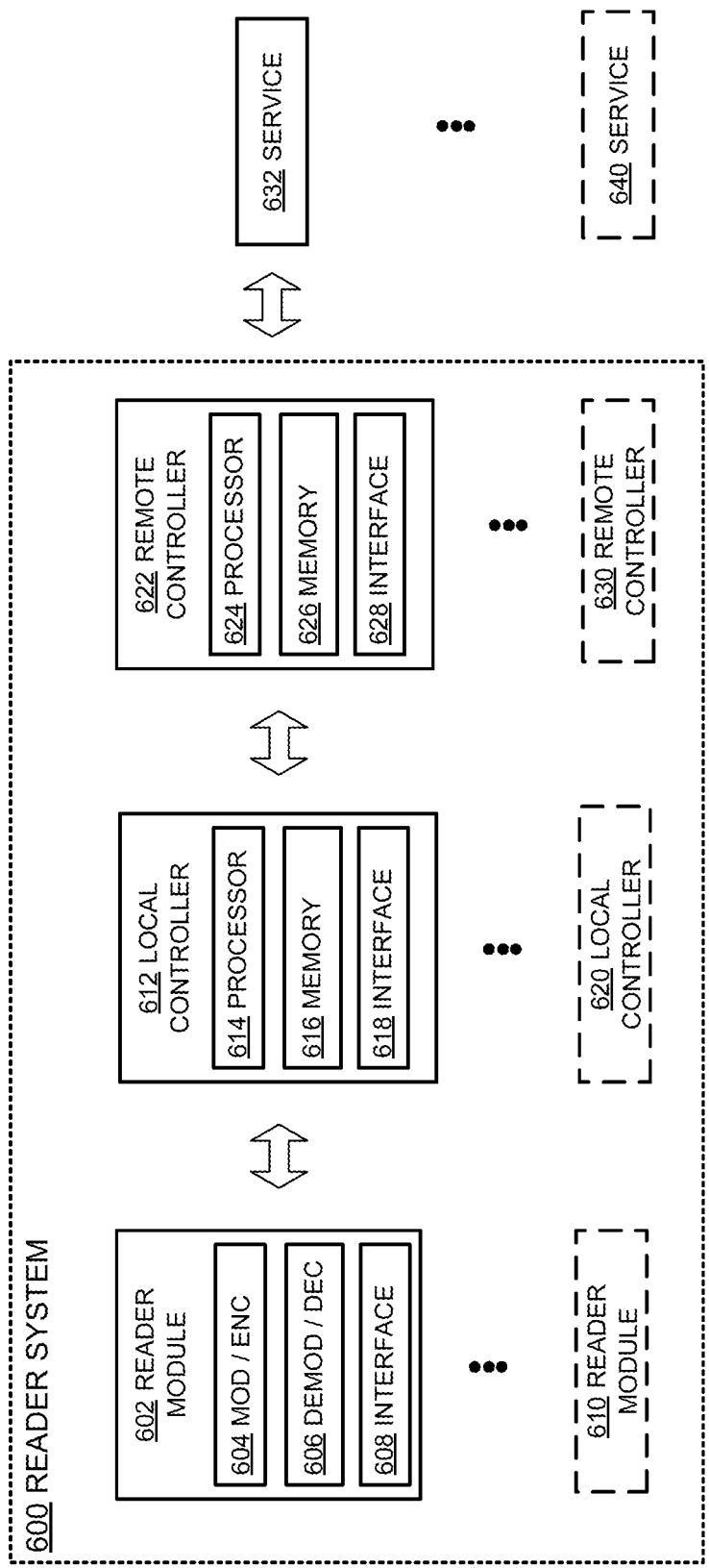
FIG. 6 is a block diagram showing a detail of an RFID reader system, according to embodiments.

FIG. 6 depicts an RFID reader system 600 according to embodiments. Reader system 600 is configured to communicate with RFID tags and optionally to communicate with entities external to reader system 600, such as a service 632. Reader system 600 includes at least one reader module 602. Reader module 602 is at least configured to transmit signals to and receive signals from RFID tags, and in some embodiments may have additional features or functionalities. Reader system 600 further includes at least one local controller 612, and in some embodiments includes at least one remote controller 622. Controllers 612 and/or 622 are configured to control the operation of reader module 602, process data received from RFID tags communicating through reader module 602, communicate with external entities such as service 632, and otherwise control the operation of reader system 600.

In some embodiments, reader system 600 may include multiple reader modules, local controllers, and/or remote controllers. For example, reader system 600 may include at least one other reader module 610, at least one other local controller 620, and/or at least one other remote controller 630. A single reader module may communicate with multiple local and/or remote controllers, a single local controller may communicate with multiple reader modules and/or remote controllers, and a single remote controller may communicate with multiple reader modules and/or local controllers. Similarly, reader system 600 may be configured to communicate with multiple external entities, such as other reader systems (not depicted) and multiple services (for example, services 632 and 640).

Reader module 602 includes a modulator/encoder block 604, a demodulator/decoder block 606, and an interface block 608. Modulator/encoder block 604 may encode and modulate data for transmission to RFID tags. Demodulator/decoder block 606 may demodulate and decode signals received from RFID tags to recover data sent from the tags. The modulation, encoding, demodulation, and decoding may be performed according to a protocol or specification, such as the Gen2 Specification. Reader module 602 may use interface block 608 to communicate with local controller 612 and/or remote controller 622, for example to exchange tag data, receive instructions or commands, or to exchange other relevant information.

Reader module 602 and blocks 604/606 are coupled to one or more antennas and/or antenna drivers (not depicted), for transmitting and receiving RF signals. In some embodiments, reader module 602 is coupled to multiple antennas and/or antenna drivers. In these embodiments, reader module 602 may transmit and/or receive RF signals on the different antennas in any suitable scheme. For example, reader module 602 may switch between different antennas to transmit and receive RF signals, transmit on one antenna but receive on another antenna, or transmit and/or receive on multiple antennas simultaneously. In some embodiments, reader module 602 may be coupled to one or more phased-array or synthesized-beam antennas whose beams can be generated and/or steered, for example by reader module 602, local controller 612, and/or remote controller 622.

Modulator/encoder block 604 and/or demodulator/decoder block 606 may be configured to perform conversion between analog and digital signals. For example, modulator/encoder block 604 may convert a digital signal received via interface block 608 to an analog signal for subsequent transmission, and demodulator/decoder block 606 may convert a received analog signal to a digital signal for transmission via interface block 608.

Local controller 612 includes a processor block 612, a memory 616, and an interface 618. Remote controller 622 includes a processor block 622, a memory 626, and an interface 628. Local controller 612 differs from remote controller 622 in that local controller 612 is collocated or at least physically near reader module 602, whereas remote controller 622 is not physically near reader module 602. For example, local Processor blocks 612 and/or 622 may be configured to, alone or in combination, provide different functions. Such functions may include the control of other components, such as memory, interface blocks, reader modules, and similar; communication with other components such as reader module 620, other reader systems, services 632/640, and similar; data-processing or algorithmic processing such as encryption, decryption, authentication, and similar; or any other suitable function. In some embodiments, processor blocks 612/622 may be configured to convert analog signals to digital signals or vice-versa, as described above in relation to blocks 604/606; processor blocks 612/622 may also be configured to perform any suitable analog signal processing or digital signal processing, such as filtering, carrier cancellation, noise determination, and similar.

Processor blocks 612/622 may be configured to provide functions by execution of instructions or applications, which may be retrieved from memory (for example, memory 616 and/or 626) or received from some other entity. Processor blocks 612/622 may be implemented in any suitable way. For example, processor blocks 612/622 may be implemented using digital and/or analog processors such as microprocessors and digital-signal processors (DSPs); controllers such as microcontrollers; software running in a machine such as a general purpose computer; programmable circuits such as field programmable gate arrays (FPGAs), field-programmable analog arrays (FPAAs), programmable logic devices (PLDs), application specific integrated circuits (ASIC), any combination of one or more of these; and equivalents.

Memories 616/626 are configured to store information, and may be implemented in any suitable way, such as the memory types described above, any combination thereof, or any other known memory or information storage technology. Memories 616/626 may be implemented as part of their associated processor blocks (e.g., processor blocks 614/624) or separately. Memories 616/626 may store instructions, programs, or applications for processor blocks 614/624 to execute. Memories 616/626 may also store other data, such as files, media, component configurations or settings, etc.

In some embodiments, memories 616/626 store tag data. Tag data may be data read from tags, data to be written to tags, and/or data associated with tags or tagged items. Tag data may include identifiers for tags such as electronic product codes (EPCs), tag identifiers (TIDs), or any other information suitable for identifying individual tags. Tag data may also include tag passwords, tag profiles, tag cryptographic keys (secret or public), tag key generation algorithms, and any other suitable information about tags or items associated with tags.

Memories 616/626 may also store information about how reader system 600 is to operate. For example, memories 616/626 may store information about algorithms for encoding commands for tags, algorithms for decoding signals from tags, communication and antenna operating modes, encryption/authentication algorithms, tag location and tracking algorithms, cryptographic keys and key pairs (such as public/private key pairs) associated with reader system 600 and/or other entities, electronic signatures, and similar.

Interface blocks 608, 618, and 628 are configured to communicate with each other and with other suitably configured interfaces. The communications between interface blocks occur via the exchange of signals containing data, instructions, commands, or any other suitable information. For example, interface block 608 may receive data to be written to tags, information about the operation of reader module 602 and its constituent components, and similar; and may send data read from tags. Interface blocks 618 and 628 may send and receive tag data, information about the operation of other components, other information for enabling local controller 612 and remote controller 622 to operate in conjunction, and similar. Interface blocks 608/618/628 may also communicate with external entities, such as services 632, 640, other services, and/or other reader systems.

Interface blocks 608/618/628 may communicate using any suitable wired or wireless means. For example, interface blocks 608/618/628 may communicate over circuit traces or interconnects, or other physical wires or cables, and/or using any suitable wireless signal propagation technique. In some embodiments, interface blocks 608/618/628 may communicate via an electronic communications network, such as a local area network (LAN), a metropolitan area network (MAN), a wide area network (WAN), a network of networks such as the internet. Communications from interface blocks 608/618/628 may be secured, for example via encryption and other electronic means, or may be unsecured.

Reader system 600 may be implemented in any suitable way. One or more of the components in reader system 600 may be implemented as integrated circuits using CMOS technology, BJT technology, MESFET technology, and/or any other suitable physical implementation technology. Components may also be implemented as software executing on general-purpose or application-specific hardware.

In one embodiment, a "reader" as used in this disclosure may include at least one reader module like reader module 602 and at least one local controller such as local controller 612. Such a reader may or may not include any remote controllers such as remote controller 622. A reader including a reader module and a local controller may be implemented as a standalone device or as a component in another device. In some embodiments, a reader may be implemented as a mobile device, such as a handheld reader, or as a component in a mobile device such as a laptop, tablet, smartphone, wearable device, or any other suitable mobile device.

Remote controller 622, if not included in a reader, may be implemented separately. For example, remote controller 622 may be implemented as a local host, a remote server, or a database, coupled to one or more readers via one or more communications networks. In some embodiments, remote controller 622 may be implemented as an application executing on a cloud or at a datacenter.

Functionality within reader system 600 may be distributed in any suitable way. For example, the encoding and/or decoding functionalities of blocks 604 and 606 may be performed by processor blocks 614 and/or 624. In some embodiments, processor blocks 614 and 624 may cooperate to execute an application or perform some functionality. One of local controller 612 and remote controller 622 may not implement memory, with the other controller providing memory.

Reader system 600 may communicate with at least one service 632. Service 632 provides one or more features, functions, and/or capabilities associated with one or more entities, such as reader systems, tags, tagged items, and similar. Such features, functions, and/or capabilities may include the provision of information associated with the entity, such as warranty information, repair/replacement information, upgrade/update information, and similar; and the provision of services associated with the entity, such as storage and/or access of entity-related data, location tracking for the entity, entity security services (e.g., authentication of the entity), entity privacy services (e.g., who is allowed access to what information about the entity), and similar. Service 632 may be separate from reader system 600, and the two may communicate via one or more networks.

In some embodiments, an RFID reader or reader system implements the functions and features described above at least partly in the form of firmware, software, or a combination, such as hardware or device drivers, an operating system, applications, and the like. In some embodiments, interfaces to the various firmware and/or software components may be provided. Such interfaces may include application programming interfaces (APIs), libraries, user interfaces (graphical and otherwise), or any other suitable interface. The firmware, software, and/or interfaces may be implemented via one or more processor blocks, such as processor blocks 614/624. In some embodiments, at least some of the reader or reader system functions and features can be provided as a service, for example, via service 632 or service 640.

Embodiments additionally include programs, and methods of operation of the programs. A program is generally defined as a group of steps or operations leading to a desired result, due to the nature of the elements in the steps and their sequence. A program may be implemented as a sequence of steps or operations for a processor but may be implemented in other processing elements such as FPGAs, DSPs, processing blocks or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to the embodiments. A storage medium according to the embodiments is a computer-readable medium, such as a memory, and is read by a processor of the type mentioned above. If a memory, it can be implemented in any of the ways and using any of the technologies described above.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

As mentioned previously, embodiments are directed to RFID ICs sensing some characteristic of their environment or of their operation. In some embodiments, an RFID IC may include or be coupled to a sensor or sensors configured to sense one or more environmental characteristics such as temperature; humidity; radiation; electromagnetic signals; light or darkness; the presence or absence of chemicals, biological agents, or other agents; or any other aspect of the tag's or item's environment. A sensor may also (or instead) be configured to sense an environmental characteristic of the IC or the item to which the IC is attached such as movement; location; acceleration; distance from one or more RF emitters; RF energy incident on the item or on an antenna associated with the item or on the IC, or a change in this incident RF energy; the power the IC extracts from the incident RF or a change in the extracted power; antenna frequency response, tuning or changes in tuning; characteristics of the tuning elements, such as resistors, capacitors, inductors, varactors, transistors or other elements the IC uses to improve power transfer from the antenna, or a change in those tuning elements or their values; or any other suitable characteristic. In some embodiments, a sensor may be configured to sense one or more aspects of the IC's function. Such a sensor (or other IC component) may sense some parameter associated with the IC's operation, such as internal voltage or internal current, or may sense whether IC components are operating normally, are damaged, are close to failure, or have failed. For example, the IC may be configured to determine a physical integrity of the IC or whether data in memory has been correctly or strongly written.

In the context of the present disclosure, any or all of the above characteristics are "environmental", are accessible to a "sensor" and are accessible to the IC. It is the intent of the present disclosure to interpret the terms "environmental" and "sensor" in their broadest possible sense. As one, but not limiting, example, a power detector on the IC is a sensor that senses received RF energy, which is environmental. The power detector may directly measure the RF energy incident on the RFID IC or an associated antenna, the power extracted by the RFID IC, a rectified voltage or current, or any other parameter related to detected power. The power detector may be a separate sensor or part of another RFID IC component such as rectifier and PMU 441, demodulator 442, modulator 446, and/or processing block 444.

The RFID IC may be configured to alert an external entity, such as a reader or the item to which the IC is attached or embedded, to the sensed characteristic or change. For example, the IC may provide sensed data to a reader and/or store the data for subsequent retrieval. The IC may also (or instead) process the sensed environmental characteristic/change and perform an action based on the processed characteristic/change to alert a reader to the characteristic/change.

The alert from RFID IC to reader may include or be a message, a flag value, a data value, a message timing or delay or any other suitable notification. In some embodiments, for example when the reply to the inventorying reader uses a standardized format, the IC may adjust the value of one or more bits in the standardized reply format, or add one or more bits to the standardized reply format, or adjust the timing of the reply, and send the adjusted reply to the reader. The reader, upon determining that the reply is different from an otherwise standard reply, may determine that the RFID IC has sensed an environmental change. Whether sending its reply according to a standardized format or not, the IC may adjust one or more bits in the reply or the timing of the reply in any suitable way. For example, the IC may switch the values of the one or more bits, adjust bits or bit values based on the sensed environmental change (e.g., its degree, type, etc.), adjust the bit or bit values based on a predetermined or dynamic encoding or adjust its reply timing based on the sensed environmental change. In some embodiments, the RFID IC need not perform any special notification, and relies instead on its participation in an inventory round or the timing of its reply in an inventory round to indicate that it has sensed an environmental change.

Figure 7:
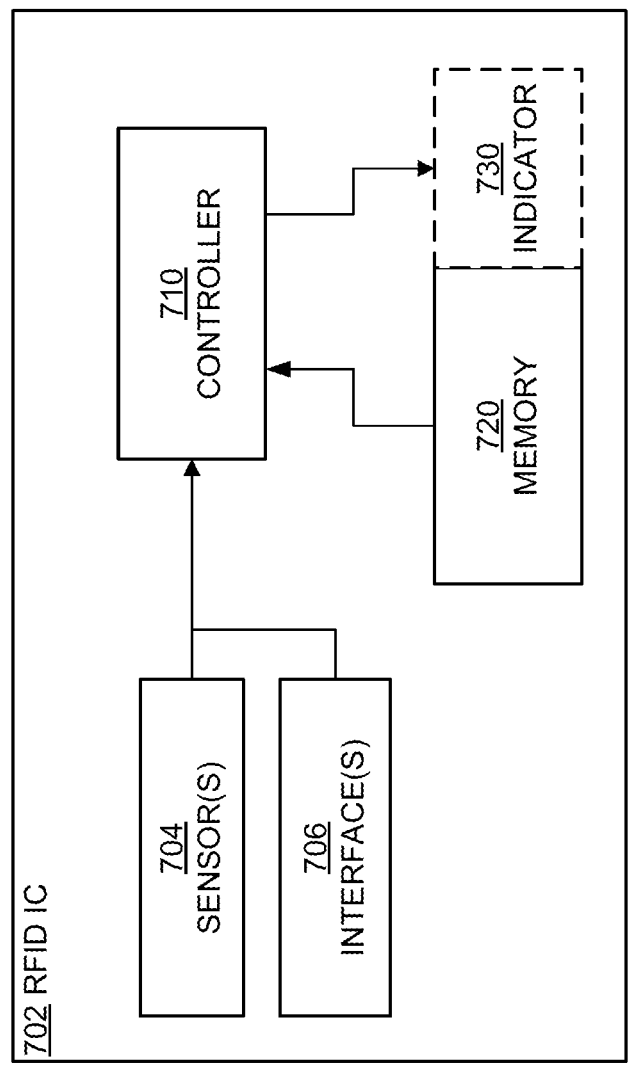
FIG. 7 depicts a diagram of an RFID IC configured to sense or detect environmental changes, according to embodiments.

FIG. 7 depicts a diagram 700 of an RFID IC 702 configured to sense or detect environmental characteristics or changes, according to embodiments. RFID IC 702 may be coupled to one or more sensors 704 configured to sense environmental characteristics or changes as described above. Sensors 704 may include a temperature sensor, humidity sensor, chemical sensor, biological agent sensor, optical sensor, radiation sensor, RF energy sensor, power detector, impedance sensor, motion sensor, acceleration sensor or any other suitable sensor. Sensors 704 may be part of RFID IC 702 or may be separate from RFID IC 702. In the latter case, RFID IC 702 may also or instead include one or more interfaces 706 configured to couple to one or more external sensors. Interfaces 706 may include one or more antennas, IC antenna ports, and/or a separate connection or interface to RFID IC 702.

RFID IC 702 further includes a controller 710, a memory 720, and optionally at least one indicator 730. Indicator 730 may be a flag, a counter or bit capable of switching between at least two different states, or any other form of electronic indicator. Indicator 730 may be implemented in a memory, as a register or flip-flop, or as another circuit component. In some embodiments indicator 730 may be a select flag, a session flag, or a notification flag, as described in the Gen2 Protocol.

Controller 710 may be configured to receive sensor data associated with aspects of the environment and/or of RFID IC 702 from sensor(s) 704 and/or interface(s) 706. Controller 710 may store the data in memory 720 for subsequent transmission to a reader, may immediately relay the data to a reader as part of an ongoing reply, may alter the timing of a current or subsequent reply, adjust an indicator 730's value, or in some other way provide an ability to notify a reader of the sensor data with or without storing the sensor data in memory 720.

In some embodiments, controller 710 may process the sensor data to determine whether an environmental characteristic has changed, and if so then alert an external reader by, for example, participating in an inventory round or advancing the RFID IC's reply timing. Controller 710 may process the sensor data based on any suitable algorithm or technique. For example, controller 710 may use averaging, peak-finding, or another data-processing algorithm; may generate intermediate values; and may compare the measured or intermediate values to one or more predetermined or dynamically determined threshold values.

In one embodiment, RFID IC 702 may observe changes in RF power incident on an associated antenna such as the antennas in FIG. 2. It may observe these changes by measuring a change in voltage or current produced by a rectifier and/or PMU such as rectifier and PMU 441, or in a variety of other ways as described above. These changes may indicate an environmental change, such as movement of the item to which the IC is attached, or whether a person's body is blocking or no longer blocking the incident RF energy, or a change in the orientation of RFID IC 702 with respect to an RF emitter, and/or a change in the RF coupling capabilities of RFID IC 702.

Regardless of the cause, controller 710 may determine whether the processed data indicate environmental and/or item changes and, if so, then in some fashion advance or modify the timing of its reply or communications to or with a reader, thereby enabling the reader to learn about and potentially act on the environmental change. For example, if the item is moving then controller 710 may want to alert the reader to pay attention because somebody may be stealing the item. In some embodiments, controller 710 may be configured to execute or implement a functionality not specified in, or in conflict with, a protocol like the Gen2 Protocol, such as advance its reply timing, adjust timing(s) of one or more symbols in its reply, or participate in an inventory round it would otherwise not have participated-in. Controller 710 may also adjust an indicator value, write data associated with and/or the actual sensor data to memory 720, adjust one or more IC parameters, enter or exit IC operating states, enable or disable one or more features, and/or perform any other suitable action.

Figure 8:
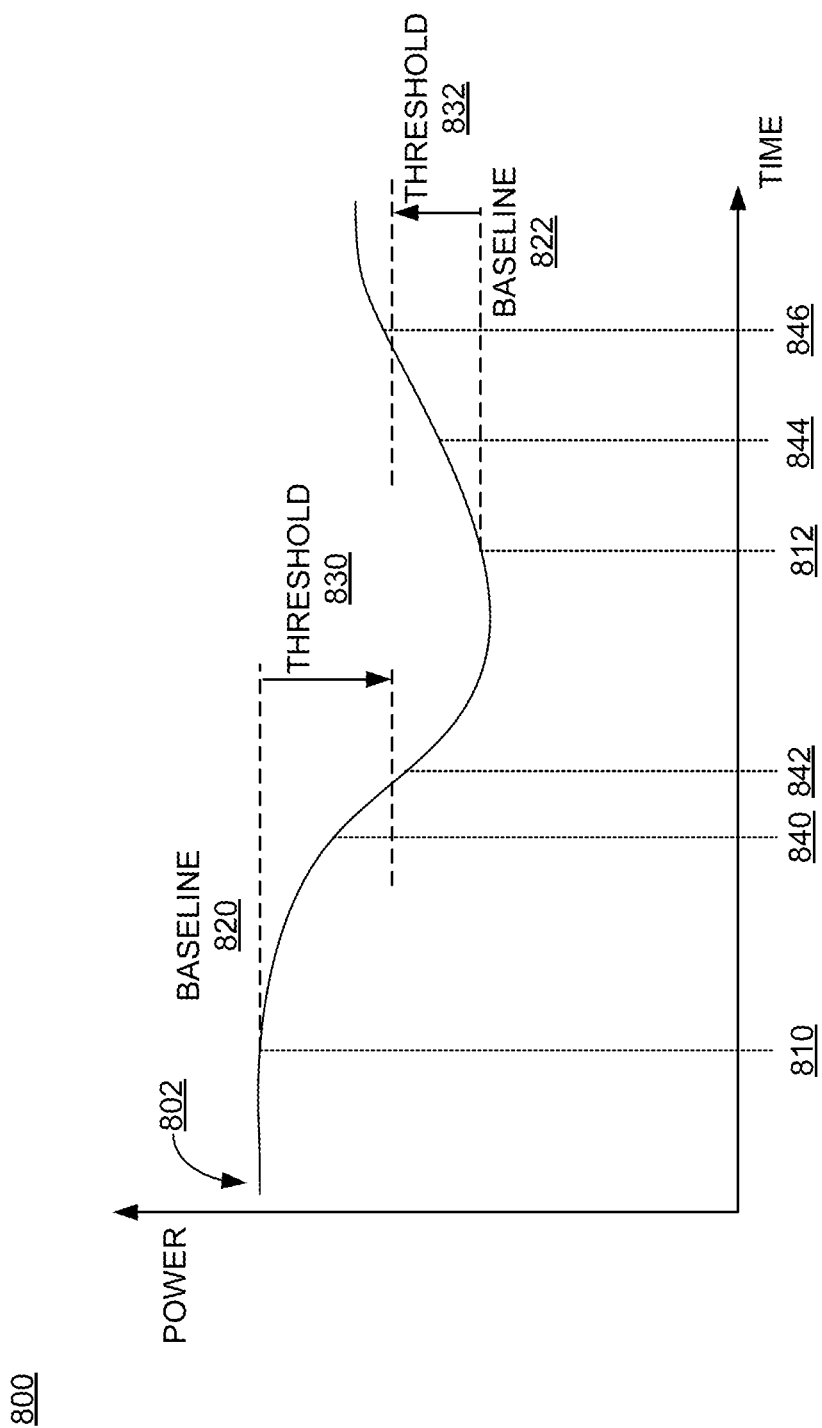
FIG. 8 depicts how an RFID IC may sense changes in received power that may represent environmental changes, according to embodiments.

FIG. 8 depicts how an RFID IC may sense a change in received power, according to embodiments. Diagram 800 is a chart depicting the power characteristic 802 sensed by an RFID IC as a function of time, with the vertical axis representing power and the horizontal axis representing time. Power characteristic 802 may represent the power of RF waves incident on an antenna associated with the RFID IC; the power sensed at an antenna port of the RFID IC; the power, voltage, and/or current extracted by the RFID IC from the incident RF waves; or any other suitable power value associated with the RFID IC. Power characteristic 802 may fluctuate with changes in the RFID IC's environment and/or operation. The RFID IC may be configured to measure power characteristic 802 using a sensor or an intrinsic circuit of the RFID IC, such as the rectifier or demodulator, as described above.

At time 810, the RFID IC begins monitoring power characteristic 802, where the monitoring may include periodic (i.e. at intervals) or continuous monitoring. The IC may receive a reader command or an interface command instructing it to begin monitoring, or it may self-determine the need for monitoring. The commanding or self-determining may cause the RFID IC to begin monitoring immediately or at a future point in time. A command that causes the RFID IC to begin monitoring may instruct the RFID IC to specifically begin monitoring, or may serve another functionality but which the RFID IC interprets as an indicator to begin monitoring. For example, in some embodiments the command may be a Select command of the Gen2 Protocol, which one or more RFID ICs interpret as an instruction to begin monitoring power characteristic 802, in addition to or instead of the Select command's functionality as specified in the Gen2 Protocol.

If the RFID IC self-determines a need for monitoring then it may do so at power-up, upon reaching a certain power level, upon entering or exiting an inventory round, when transitioning between internal states, upon a particular sensor reading, upon a timer or counter reaching a value or expiring, upon an event related to the IC or to the item to which the IC is attached, upon entering or exiting a sleep state, or upon any other triggering event.

The RFID IC may first measure a first baseline value 820 of power characteristic 802 at time 810. Subsequently, the IC may measure power characteristic 802 continuously, periodically, aperiodically, when commanded-to, or in any other suitable way. If aperiodic, the IC may set its measurement timing based on a predetermined interval, a random time interval, an interval specified in a previously received command, a measured power value, a time since monitoring started, a time since the last measurement, or any other suitable timing parameter. In some embodiments, the IC may adjust its measurement timing during measurement, for example based on received reader commands, measured values or sensor readings, an IC- or item-related event, or any other event.

After the RFID IC has begun monitoring, it may continue monitoring despite satisfying one or more threshold criteria, or it may halt monitoring upon satisfying those one or more threshold criteria (e.g. halt criteria). The threshold criteria may be provided by an external entity (e.g., in a command from a reader) and/or may be determined by the IC itself. The threshold criteria may include an elapsed time since monitoring began, a total number of measurements, a change in the environment, a change in IC operating state, a received command, a sensor value or change in sensor value, a value of or change in measured power, an IC event, or any other suitable criteria.

One example of a threshold criteria is a change in measured power (e.g., the difference between a previously measured and a currently measured power) that meets a value threshold. In this disclosure, "meeting" a threshold means reaching, exceeding, or passing (for example, in either a positive or a negative direction) the threshold. For example, in diagram 800 the RFID IC may be configured to perform an action and/or halt monitoring power characteristic 802 if the difference between measured power value 842 and first baseline value 820 meets first threshold 830. After the RFID IC measures the first baseline value 820 at time 810, power characteristic 802 decreases. At time 840, the RFID IC may take a second measurement and compare the second measurement to the first baseline value 820. Upon determining that the difference between first baseline value 820 and the second measurement does not meet first threshold 830, the RFID IC may continue monitoring power characteristic 802. At time 842, the IC may take a third measurement of power characteristic 802 and compare the first baseline value 820 to the third measurement. Upon determining that the difference between the first baseline value 820 and third measurement meets first threshold 830, the IC may perform an action and/or halt monitoring power characteristic 802.

In some embodiments, the action or halt criteria may involve multiple thresholds. For example, an RFID IC may use first threshold 830 to determine that a power decrease has satisfied a first criterion, and may then use second threshold 832 to determine that a subsequent power increase has satisfied a second criterion. Satisfying both criteria may cause the RFID IC to perform the action or to halt measuring. In some embodiments, after satisfying the first criterion, the RFID IC may measure a second baseline value 822 of power characteristic 802 at time 812. At time 844, the RFID IC may then make a fourth measurement of power characteristic 802 and compare the second baseline value 822 and fourth measurements. If the difference between the second baseline value 822 and the fourth measurement does not meet second threshold 832, then the second criterion is not satisfied. At time 846 the RFID IC may make a fifth measurement of power characteristic 802 and compare the second baseline value 822 and fifth measurement. Upon determining the difference between the second baseline value 822 and the fifth measurement meets second threshold 832, the RFID IC may determine the second criterion has been satisfied.

First and second thresholds 830 and 832 may differ in value or may be the same. In some embodiments, an RFID IC may use multiple thresholds. For example, an RFID IC may be configured to use a first threshold to monitor power decreases, a second to monitor power increases, a third to monitor an absolute value, and so on. The RFID IC may choose which threshold to use based on a received command, a history of measured values, a stored program or algorithm, an operating state, previously used thresholds, or some other determination.

In FIG. 8, new baseline values are determined when a criterion is satisfied. In other embodiments, new baseline values may be determined upon any other suitable event. For example, the IC may measure a new baseline value if the current criterion has not been satisfied for a certain period of time.

Whereas FIG. 8 describes a threshold-based approach to sense environmental power changes, in other embodiments a threshold-based approach may be used to sense changes in other environmental parameters. For example, an RFID IC may use a threshold-based approach to monitor temperature, chemical presence, or any other environmental parameter.

In some embodiments, an RFID IC may measure a slope or rate-of-change (e.g., a derivative) of an environmental parameter, an absolute value or magnitude of the environmental parameter, an integral of the environmental parameter, or any other parameter or function based on the environmental parameter. In these instances, the RFID IC may compare the measured parameter or function to one or more thresholds to determine whether the threshold(s) have been met and therefore whether an action or halt criterion has been met. The threshold(s) may have been previously provided to the RFID IC by an external entity (e.g., an RFID reader or reader system), or may have been previously measured by the RFID IC itself.

As noted above, an RFID IC may take an action upon satisfying one or more criteria. For example, the IC may adjust an indicator value; reply immediately; write a value to a register, flag, or memory; enter and/or exit an operating state; enable or disable one or more features; execute a protocol or non-protocol functionality; advance a reply timing; change an inventory slot count; wake from a sleep state; enter an inventory round; and/or perform any other action. The RFID IC may also store and/or transmit the identity of the satisfied criterion, data associated with the criterion, and/or the measured data. The actions performed by the RFID IC upon satisfying a criterion may be preprogrammed in the IC or may be specified by a command. As one example of the latter, a command that instructs the RFID IC to begin monitoring its environment may also specify the action the IC should take upon satisfying the criterion. In some embodiments, the RFID IC may perform different actions or series of actions, depending on whether different criteria or sets of criteria have been met.

In some embodiments, baselines 802, 822, or other baselines and/or thresholds 830, 822 or other thresholds may be stored at time of IC manufacture or enabled by an external entity. In other embodiments the RFID IC may learn the baselines and/or thresholds based on history or usage.

Figure 9:
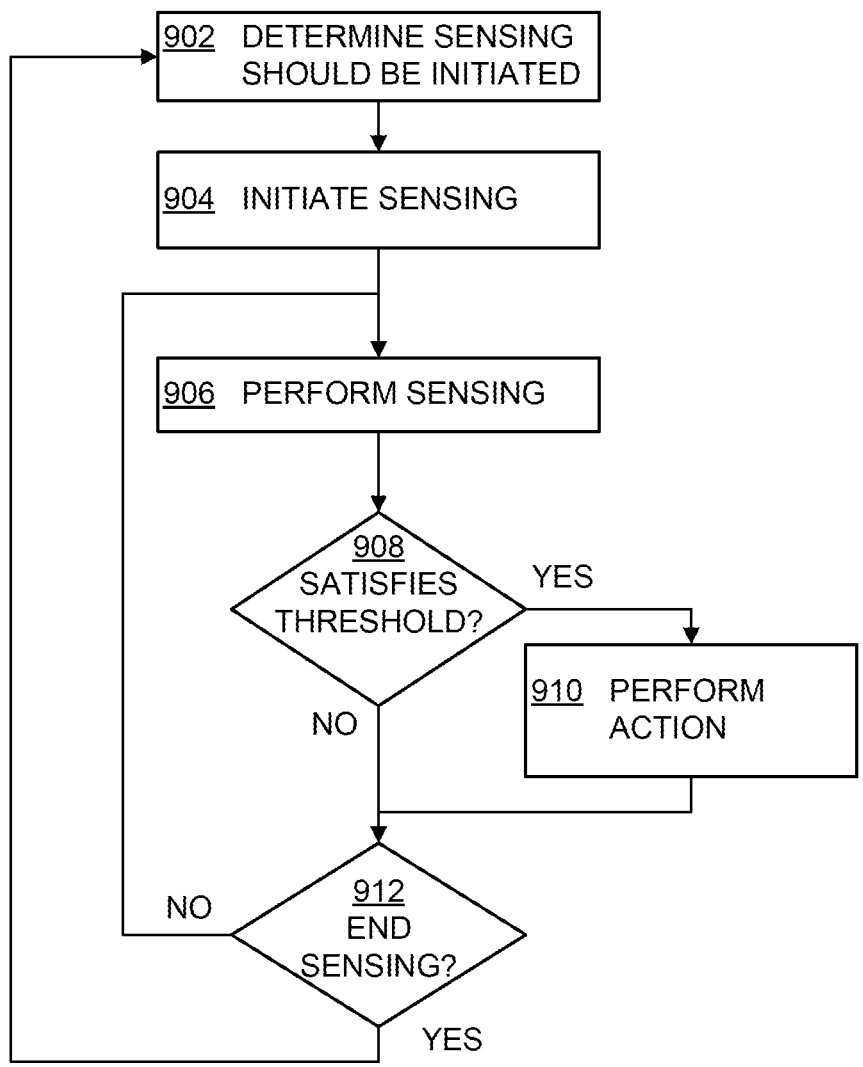
FIG. 9 is a flowchart depicting a process for an RFID IC to sense environmental changes using a threshold-based approach, according to embodiments.

FIG. 9 is a flowchart depicting a process 900 for an RFID IC to compare environmental changes to a threshold, according to embodiments. Process 900 begins at step 902, where either a reader or the RFID IC itself determines that the IC should initiate sensing, as described above in relation to FIG. 8. At step 904, the IC initiates sensing, for example by making a baseline measurement or recalling a baseline value from memory. At step 906, the IC performs sensing as described above. At step 908, the IC determines whether a measured value or a parameter derived from the measured value (e.g., a rate of change) meets a threshold, as described above, and if so then at step 910 the IC performs an action as described above. If the IC determines at step 908 that the threshold has not been met, then the IC may proceed to step 912 to determine whether it should halt sensing. If at step 912 the IC determines that it should not halt sensing, then the IC may return to step 906. If at step 912 the IC determines that it should halt sensing, then the IC may do so, and at a subsequent time the IC may again initiate sensing at step 902.

Figure 10:
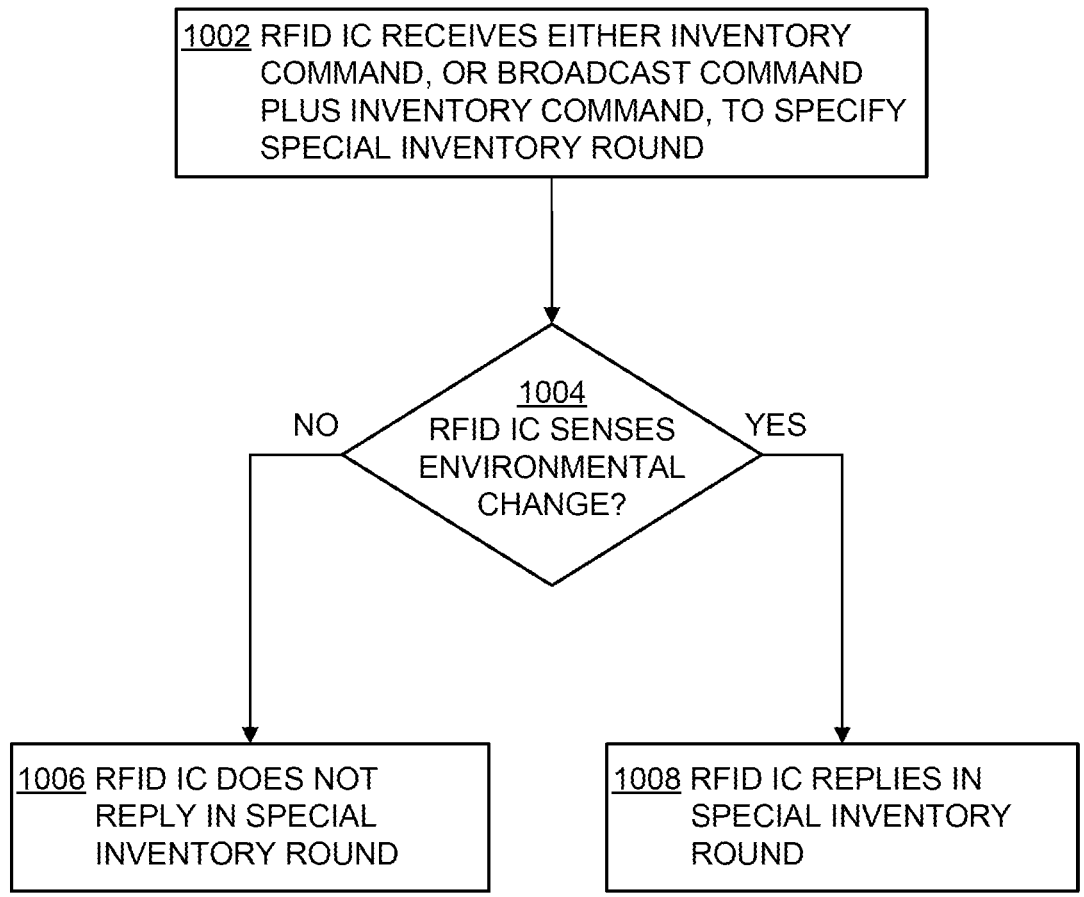
FIG. 10 is a flowchart depicting a process for an RFID IC to join a special inventory round when sensing an environmental change, according to embodiments.

FIG. 10 is a flowchart depicting a process 1000 for an RFID IC to join a special inventory round upon sensing an environmental change, according to embodiments. As described above, a reader may initiate such a special inventory round intermittently or continuously. The reader may reserve the inventory round solely for ICs with sensed environmental changes, or it may construct an inventory round in which ICs without sensed environmental changes are inventoried, but also in which ICs with sensed environmental changes can enter and quickly alert the reader to their status.

Process 1000 begins at step 1002, where an RFID IC receives either an inventorying command initiating the special inventory round, or one or more broadcast commands followed by an inventorying command that together initiate the special inventory round. If the former, then the inventorying command can be a standard command, such as a Query of the Gen2 Protocol, or a custom command; in either case one or more command fields can initiate the special inventory round or be repurposed to initiate the special inventory round. If the latter, then the broadcast command can be a Select or Challenge of the Gen2 Protocol or a custom command, and the inventorying command can be a standard command, such as a Query of the Gen2 Protocol, or a custom command. The broadcast or inventorying commands may use session flags of the Gen2 Protocol or any other suitable flags to facilitate initiating the inventory round, along with the one or more command fields. Regardless of how the round is started, the initiating command(s) can instruct ICs that have already sensed environmental changes to join the round, or ICs that sense environmental changes to join even after the round has started, or ICs to join the round but not reply until they sense an environmental change. In some cases an IC may assert its tag notification (TN) flag (specified in the Gen2 Protocol) upon sensing an environmental change and the Select command may use the TN value (e.g., asserted or not asserted) to identify RFID ICs that have sensed environmental changes.

At step 1004, which, depending on embodiments may occur prior to, coincident with or after step 1002, the RFID IC determines whether it has sensed an environmental change. If at step 1004 the IC determines that it has not sensed an environmental change then it proceeds to step 1006, where it does not participate or reply in the special inventory round. On the other hand, if at step 1004 the IC determines that it has sensed an environmental change then it proceeds to step 1008 where it participates and replies in the special inventory round. Upon sensing the environmental change, the IC may record the change as described above, such as by setting a flag and/or by writing data associated with the change to memory.

Figure 11:
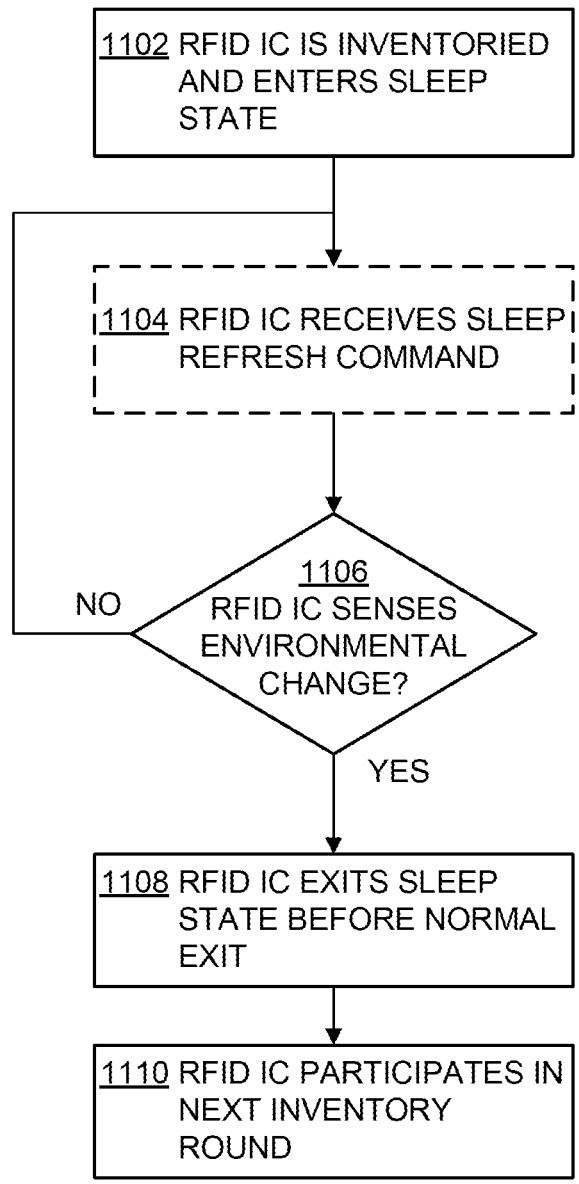
FIG. 11 is a flowchart depicting a process for an RFID IC to exit a sleep state and reply upon sensing an environmental change, according to embodiments.

As described above, an RFID IC may be configured to participate in an inventory round when it senses an environmental change even if the IC has already participated in the inventory round, was not asked to participate in the inventory round, is not eligible to participate in the inventory round, or is asleep in the inventory round. The flowchart of FIG. 11, depicting a process 1100, is an example of the latter. At step 1102, an RFID IC such as IC 702 participates in an inventory round for RFID ICs whose session flag has a first value. After successfully inventorying the IC the reader causes the IC to change its session flag from the first value to a second value, after which the IC will not participate in inventory rounds for ICs whose session flag has the first value. ICs whose session flags have the second value may sometimes be said to be "asleep" or in a "sleep state". In some embodiments the reader may periodically transmit refresh commands, such as at step 1104, to cause ICs in this sleep state to maintain their session flags at the second value, such as is described in U.S. Pat. No. 9,330,284 issued on May 3, 2016, hereby incorporated by reference in its entirety. Now suppose that while asleep, the IC at step 1106 senses an environmental change that meets a threshold. The IC may then exit the sleep state, for example by changing its session flag from the second value back to the first value or even without changing its session flag, thereby causing the IC to participate in subsequent inventory rounds 1110 for ICs whose session flag has the first value. As noted above, the IC may further alert the reader of the environmental change when it is inventoried, for example by asserting its TN flag. Also note that, at step 1106, if the IC has not sensed an environmental change then it re-enters step 1106. Of course, alternatively, the IC can exit its sleep state normally, such as if its session flag decays back to the first value.

When an RFID IC senses an environmental change (e.g., one or more sensor values meet thresholds or satisfy criteria), the IC may attempt to alert or draw the attention of an RFID reader. In one embodiment, the IC may join a special inventory round that a reader dedicates for ICs with sensed environmental changes. In another embodiment, the IC may join or rejoin an ongoing inventory round which it otherwise would not have joined or rejoined absent the sensed change. As one example, the RFID IC may participate in an ongoing inventory round even if the IC was not previously requested to participate or if the IC is otherwise not eligible for participation. In yet another embodiment, the RFID IC may advance its reply timing upon sensing an environmental change, thereby responding sooner to the reader than it would have absent the sensed change. As another example, the IC may re-participate in an ongoing inventory round upon sensing the environmental change even if the IC has already been inventoried in the round, by exiting a sleep state as described above or by refraining from entering the sleep state in the first place, even if commanded to do so. In this case, the IC may reply multiple times in the same inventory round. The IC may also set a notification flag to alert the reader that the IC has sensed an environmental change.

Figure 12:
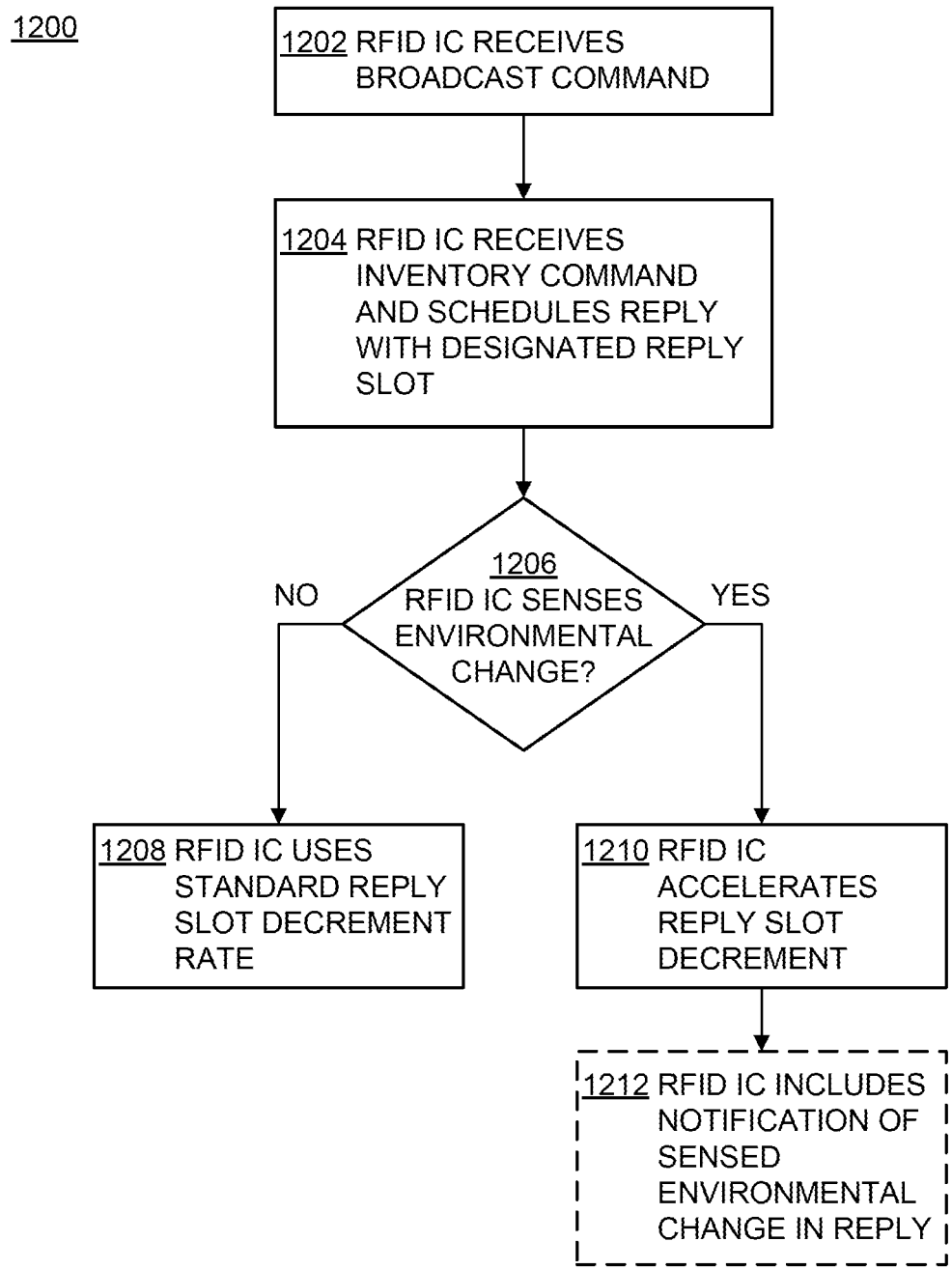
FIG. 12 is a flowchart depicting a process for an RFID IC to advance its reply scheduling when sensing an environmental change, according to embodiments.

FIG. 12 is a flowchart depicting a process 1200 for an RFID IC to advance its reply timing when sensing an environmental change, according to embodiments. At first step 1202, an RFID IC similar to IC 702 receives a broadcast command configured to instruct the IC to (1) monitor an environmental parameter, (2) advance its reply timing upon sensing a change in the environmental parameter that meets a threshold, and optionally (3) assert a notification indicator. The broadcast command can optionally be a Select command of the Gen2 Protocol, and the notification indicator can be the TN flag of the Gen2 Protocol. At step 1204, the IC receives an inventorying command and joins the commanded inventory round, scheduling a reply in a designated slot, where "slot" as used herein may have the same meaning as in the Gen2 Protocol and the inventory command may be a Query command of the Gen2 Protocol. At step 1206, after entering the inventory round but before reaching its designated reply slot, the IC senses an environmental parameter change that meets the threshold and proceeds to step 1210 where it accelerates its reply-slot decrement rate, thereby rescheduling the reply, potentially to the front of the reply queue. At step 1212, the IC optionally asserts a notification, such as its TN flag, that it has sensed an environmental change. The reader, upon receiving the asserted TN flag, knows to pay special attention to this RFID IC because, for example, it may represent an item being stolen. If the reader is a synthesized-beam reader (SBR) or otherwise capable of generating multiple beams, for example via multiple antennas, the reader may choose to focus a beam in the direction of the IC for an extended period of time as a result of determining that the IC has sensed an environmental change. The reader may also (or instead) increase or maintain an inventory rate of the IC, for example by sending a nonacknowledgement command or refraining from acknowledging the IC, as disclosed in commonly assigned U.S. Pat. No. 9,818,084 issued on Nov. 14, 2017, hereby incorporated by reference in its entirety. If the IC does not sense an environmental change then it continues to decrement its slot counter at the standard rate, replying to the reader when the slot counter reaches zero (for example, in the case of behavior according to the Gen2 Protocol).

Of course, step 1206, despite being shown subsequent to step 1204 in process 1200, may occur before or after step 1204. Similarly, the IC may have initiated environmental sensing of its own volition, or could be configured to always sense, or may begin sensing upon receiving the inventory command at step 1204.

Suppose, due to RF noise or a reply collision with another RFID IC, that the reader does not hear the reply from the IC and therefore does not acknowledge the IC as being heard. In this case the IC may be configured to reply again in the next timeslot, to ensure the reader hears it, or to re-participate in the inventory round for a fixed time or number of replies (e.g., twice, three times, or any suitable number of times). Alternatively, the IC may be configured to responding incessantly, even if the reader has responded to one or more previous replies in the round, to allow the reader to track its movement, until the reader quiets it using a special command, a power-down, or any other suitable means to quiet the tag.

Accelerating the reply-slot decrementing in step 1210 can take many forms. In one embodiment the IC may increase its reply-slot decrement rate. Using the Gen2 Protocol as an example, the IC may decrement its slot counter by a value greater than 1 at each QueryRep. In another embodiment the IC may change its current slot count to a smaller value, perhaps even to 1 or zero regardless of the prior slot-count value. In yet other embodiments, the IC may change its slot counter value to some other nonzero value that is nevertheless smaller than the current value.

Whereas process 1200 shows a reply-slot decrement rate, in other embodiments an RFID protocol may decrement time rather than slots, or may use another scheduling algorithm altogether to avoid tag collisions. The present disclosure does not rely-on or assume any particular scheduling algorithm or protocol, but instead is protocol-agnostic and is focused on RFID ICs accelerating their reply timing in response to sensing an environmental change.

In addition to or instead of advancing a reply schedule, an RFID IC may schedule and send multiple replies in a single inventory round, similar to the re-participation described in relation to process 1100. In such embodiments, the IC may send its additional replies immediately after the first reply or separated by a time duration or number of slots.

In some embodiments, the extent of an RFID IC's participation in an inventory round may be correlated with the magnitude of the sensed environmental change. A relatively large environmental change may cause the IC to participate in the inventory round more (for example, in terms of participation time and/or number of responses or successful inventory opportunities) than a relatively small environmental change, and vice-versa. The magnitude of a sensed environmental change may alternatively be a magnitude of a derivative of the change, a magnitude of a time associated with the change, a number of changes and/or any other suitable parameter associated with the change. In this way, the inventorying reader may be able to determine, to at least a first order, the magnitude or severity of the environmental change based on the RFID IC's participation. In some embodiments, the spacing between consecutive replies may be indicative of the magnitude of the sensed environmental change. For example, consecutive replies spaced closely in time or slots may indicate a large environmental change, whereas consecutive replies spaced far in time or slots may indicate a small environmental change. In some embodiments, the IC may also (or instead) encode an indication of the magnitude of a sensed environmental change in one or more replies, for example in one or more bits or timing in the replies, as described above.

The operations described in processes 900, 1000, 1100, and 1200 are for illustrative purposes only. These operations may be implemented using additional or fewer operations and in different orders using the principles described herein.

An RFID reader system, suitably configured, can identify, based on the processes and algorithms described above, RFID ICs that have sensed environmental changes. In one embodiment, the reader system may understand that an IC that unexpectedly participates in an inventory round (e.g., if the IC repeatedly participates in the inventory round, or sends multiple replies in a known pattern, or participates despite not being asked to, or was known to be asleep) has sensed an environmental change. In another embodiment, the reader system may be configured to extract and use a notification from an RFID IC to determine that the RFID IC has sensed an environmental change.

Upon determining that an RFID IC has sensed an environmental change as described above, the reader system may take any suitable and appropriate action. For example, the reader system may initiate a special inventory round, as described above in relation to FIG. 10. The reader system may access environmental-change data stored on the IC and use the accessed data to identify the sensed environmental change. The reader system may write data associated with the change to the IC—for example, the reader system may write data to a fast-moving IC indicating the IC is potentially being stolen. The reader system may temporarily silence other, nearby RFID ICs, so that it can focus on the notifying IC. The reader system may steer a synthesized beam toward the IC, potentially rereading the IC or inventorying other RFID ICs in the vicinity of the IC with the environmental change. The reader system may alert other readers or reader systems to focus on the vicinity of the IC or on other areas of interest, for example exits from a store or facility if the environmental change is that the IC is moving.

The reader system may be configured to provide an alert for particular environmental changes. For example, if the reader system determines that an IC has sensed environmental changes corresponding to potential theft then the reader system may cause or notify a system to activate anti-theft measures. As another example, if the reader system determines that an IC has sensed environmental changes corresponding to a hazardous chemical, the reader system may cause or notify a system to take appropriate measures.

In some embodiments, a reader system may notify another entity if an RFID IC senses environmental changes, without necessarily providing an alert as described above. For example, the reader system may notify a store monitoring system that a tagged item is moving quickly but may not necessarily sound an anti-theft alarm. The reader system may be configured to store information about the sensed environmental change, either in local storage included in or coupled to the reader system or in remote storage such as a network-accessible database or device. For example, the information may be stored as part of a history of the RFID IC and/or its associated item. In other embodiments, the reader system may perform any suitable action related to or associated with the sensed environmental change.

Some reader systems may not be configured to identify RFID ICs that have sensed an environmental change. For example, some readers may not recognize that RFID ICs unexpectedly participating in inventory rounds may have sensed an environmental change or may not recognize environmental change notifications in RFID IC replies. Readers that are configured to identify RFID ICs that have sensed an environmental change may indicate as such to the ICs, allowing RFID ICs to discriminate between readers configured or unconfigured to differentiate environment-sensed replies. In one embodiment, suitably configured readers may transmit commands or operate according to a different protocol than unconfigured readers. In some embodiments, suitably configured readers may use substantially the same protocol as unsuitably configured readers, but may also use additional, custom commands, or adjusted protocol commands, to indicate their additional capabilities with respect to environmental change detection.

RFID ICs may be designed to discriminate between suitably configured and unconfigured readers and may adjust their replies accordingly. In some embodiments, ICs configured to notify readers of sensed environmental change as described above may only notify configured readers and not unconfigured readers, for example by responding to unconfigured readers without using advanced reply timing or other features described above. In one embodiment, ICs may notify configured readers by sending replies based on a first protocol, while communicating with unconfigured readers by sending replies based on a second protocol different from the first. In other embodiments, an RFID IC may notify both configured and unconfigured readers of sensed environmental change, even if unconfigured readers cannot interpret or understand the notifications. In some embodiments an RFID IC may determine whether to notify a reader of a sensed environmental change based on a parameter associated with the IC, the reader and/or the environment. Such parameters may include reader identity, reader type, reader feature(s), number of readers in the environment, reader/IC location, time, IC population in the environment, or any other suitable parameter.

An RFID reader system configured to identify RFID ICs that have sensed environmental changes may further be configured to determine or receive information about whether environmental changes are likely, and if so facilitate its communication with RFID ICs attempting to provide environmental change notification. For example, a video camera system for a retailer may determine that a customer is moving in a suspicious manner toward an exit and therefore may be attempting to steal items. Based on this likelihood information, the RFID reader system may then facilitate communications with RFID ICs attempting to provide notification by, for example, initiating special inventory rounds and/or determining whether RFID ICs have been recently trying to provide environmental change notifications. As another example, an RFID reader system in a retailer may be configured to base the frequency of special inventory rounds and/or the priority on determining whether RFID ICs are trying to provide environmental change notifications on customer traffic in the retailer, with the assumption that higher customer traffic may correlate to higher likelihood of thefts. As prioritizing inventorying of RFID ICs sensing environmental changes may come at the expense of the normal inventorying of RFID ICs, a suitably-configured RFID reader system may be configured to adjust such prioritization based on environmental change likelihood information and any other suitable information, internally-determined or received from one or more external entities.

According to one example, a method for an RFID IC to provide an alert for an environmental change may include participating in an inventory round upon sensing the environmental change, else not participating in the inventory round. The inventory round may be a special inventory round for ICs to provide alerts or a standard inventory round.

According to another example, the method may include participating in an inventory round, then receiving a command to refrain from continuing to participate in the inventory round, but upon sensing an environmental change continuing to participate despite having received the refraining command.

According to yet another example, the method may include participating in an inventory round with an initial reply scheduling, but advancing the reply scheduling upon sensing an environmental change. The initial reply scheduling may be determined upon one or more of an IC powerup, receiving a command, expiration of a timer, or an IC event.

According to a further example, the method may include replying multiple times in an inventory round.

For at least some of the examples described above:
a. sensing the environmental change may include performing measurement(s) of environmental parameter(s) at one or more times, comparing the measurement(s) to each other and/or to baseline values to determine a change in the environmental parameter, and determining if the change meets a threshold,
b. the environmental parameter may be an RF parameter and may be or may include a power, voltage, current and/or circuit parameter derived from, related to or rectified from an RF waveform present at an antenna port of the IC,
c. generating the alert may include adjusting a value of one or more bits in the IC's reply to indicate the alert, adjusting a timing of the IC's reply to indicate the alert, or both,
d. the IC may send the alert with, or instead of, its standard inventory reply,
e. the method may include replying multiple times in the inventory round, and at least one reply may contain the alert The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A method for a Radio Frequency Identification (RFID) integrated circuit (IC) to provide an alert, the method comprising:
performing a first measurement of an environmental parameter at a first time;
determining a difference by comparing the first measurement to a second measurement of the environmental parameter measured at a second time, or to a baseline value; and
if the difference meets a threshold, then providing the alert by:
participating in an inventory round; and
sending, in the inventory round, a reply having an indicator for the alert, wherein the indicator is at least one of:
a value of one or more bits in the reply, and
a timing adjustment of the reply.

2. The method of claim 1, wherein the parameter includes at least one of a power, a voltage, and a current rectified from an RF waveform present at an antenna port of the IC.

3. The method of claim 1, wherein the parameter includes values of tuning elements used to improve power transfer from an antenna.

4. The method of claim 1, further comprising performing the timing adjustment by accelerating a reply-slot decrement rate of the reply.

5. The method of claim 1, wherein:
the first time is one of IC power-up, upon receiving a command, and an IC event; and
the second time is one of upon receiving a command, expiration of a timer, and an IC event.

6. The method of claim 1, further comprising at least one of retrieving the baseline value from an IC memory and receiving the baseline value from a reader.

7. A method for a Radio Frequency Identification (RFID) integrated circuit (IC) to provide an alert, the method comprising:
performing a first measurement of an environmental parameter at a first time;
comparing the first measurement to a baseline value or a second measurement of the environmental parameter measured at a second time to determine a difference; and
if the difference meets a threshold, then providing the alert by advancing a scheduled reply in an ongoing inventory round, else not advancing the reply.

8. The method of claim 7, wherein the parameter includes at least one of a power, a voltage, and a current rectified from an RF waveform present at an antenna port of the IC.

9. The method of claim 7, wherein the parameter includes characteristics of tuning elements used to improve power transfer from an antenna.

10. The method of claim 7, wherein:
the scheduled reply is to be sent at a third time; and
advancing the reply comprises rescheduling the reply to be sent at a fourth time prior to the third time.

11. The method of claim 7, further comprising scheduling another reply in the ongoing inventory round, wherein providing the alert further comprises replying multiple times in the ongoing inventory round.

12. The method of claim 7, further comprising generating the reply such that at least one of:
a value of at least one bit in the reply indicates the alert, and
a timing of the reply indicates the alert.

13. The method of claim 7, wherein:
the first time is one of IC power-up, upon receiving a command, and an IC event; and
the second time is one of upon receiving a command, expiration of a timer, and an IC event.

14. The method of claim 7, further comprising at least one of retrieving the baseline value from an IC memory and receiving the baseline value from a reader.

15. A method for a Radio Frequency Identification (RFID) integrated circuit (IC) to provide an alert, the method comprising:
performing a first measurement of an environmental parameter at a first time;
comparing the first measurement to a baseline value or a second measurement of the environmental parameter measured at a second time to determine a difference; and
if the difference meets a threshold, then providing the alert by replying multiple times in an inventory round.

16. The method of claim 15, wherein the parameter includes at least one of a power, a voltage, and a current rectified from an RF waveform present at an antenna port of the IC.

17. The method of claim 15, wherein the parameter includes characteristics of tuning elements used to improve power transfer from an antenna.

18. The method of claim 15, further comprising:
in response to replying in the inventory round, receiving a command to enter a sleep state; and
despite receiving the command, refraining from entering the sleep state and instead continuing to reply in the inventory round.

19. The method of claim 15, wherein replying multiple times comprises replying with at least one reply with an indication of the alert, wherein the indication includes at least one of a timing of the reply and a value of at least one bit in the reply.

20. The method of claim 15, wherein:
the first time is one of IC power-up, upon receiving a command, and an IC event; and
the second time is one of upon receiving a command, expiration of a timer, and an IC event.

21. The method of claim 15, further comprising at least one of retrieving the baseline value from an IC memory and receiving the baseline value from a reader.

* * * * *

UNITED STATES PATENT AND TRADEMARK OFFICE
CERTIFICATE OF CORRECTION

PATENT NO. : 11,341,837 B1
APPLICATION NO. : 17/134729
DATED : May 24, 2022
INVENTOR(S) : Christopher J. Diorio et al.

It is certified that error appears in the above-identified patent and that said Letters Patent is hereby corrected as shown below:

In the Specification

Column 21, Line 46-47, Delete "nonacknowledgement" and insert -- non acknowledgement --.

Column 25, Line 23, Delete "alert" and insert -- alert. --.

Column 25, Line 42, Delete "and or" and insert -- and/or --.

Signed and Sealed this
Sixth Day of September, 2022

Katherine Kelly Vidal
*Director of the United States Patent and Trademark Office*